United States Patent
Niwa

(10) Patent No.: US 7,505,680 B2
(45) Date of Patent: Mar. 17, 2009

(54) IMAGE PICKUP APPARATUS

(75) Inventor: Toshio Niwa, Hino (JP)

(73) Assignee: Olympus Corporation, Tokyo (JP)

( * ) Notice: Subject to any disclaimer, the term of this patent is extended or adjusted under 35 U.S.C. 154(b) by 503 days.

(21) Appl. No.: 11/452,274

(22) Filed: Jun. 14, 2006

(65) Prior Publication Data
US 2006/0285845 A1 Dec. 21, 2006

(30) Foreign Application Priority Data
Jun. 16, 2005 (JP) .............................. 2005-176553

(51) Int. Cl.
*G03B 15/03* (2006.01)

(52) U.S. Cl. .................... 396/155; 396/164; 396/175; 396/176; 396/439; 348/371; 362/16; 362/18

(58) Field of Classification Search ................. 396/155, 396/164, 175, 176, 439; 362/18, 16; 348/371
See application file for complete search history.

(56) References Cited

U.S. PATENT DOCUMENTS

| | | | |
|---|---|---|---|
| 5,614,970 A * | 3/1997 | Takagi et al. ................. 396/164 |
| 5,772,302 A * | 6/1998 | Ishikawa et al. ............... 362/3 |
| 6,381,415 B1 * | 4/2002 | Terada ......................... 396/176 |
| 6,575,582 B2 | 6/2003 | Tenmyo | |
| 6,628,329 B1 * | 9/2003 | Kelly et al. ................. 348/252 |
| 6,632,004 B2 * | 10/2003 | Sugawara et al. ........... 362/281 |
| 6,807,369 B1 * | 10/2004 | Tenmyo ....................... 396/175 |
| 6,876,763 B2 * | 4/2005 | Sorek et al. .................. 382/162 |
| 7,424,216 B2 * | 9/2008 | Liem ........................... 396/155 |
| 2003/0052990 A1 * | 3/2003 | Mazzapica .................. 348/362 |
| 2006/0045501 A1 * | 3/2006 | Liang et al. .................... 396/62 |

FOREIGN PATENT DOCUMENTS

| JP | 10-233950 A | 9/1998 |
|---|---|---|
| JP | 2001-264859 A | 9/2001 |

* cited by examiner

*Primary Examiner*—Patrick J Assouad
*Assistant Examiner*—Michael A Strieb
(74) *Attorney, Agent, or Firm*—Westerman, Hattori, Daniels & Adrian, LLP.

(57) ABSTRACT

An image pickup apparatus includes an imaging optical system, an image sensor, an image signal processing section and a light-amount characteristic giving section. The imaging optical system has a distortion in such a way as to form an image whose center part is stretched, and whose peripheral part is squeezed. The image sensor has a light reception surface at which a subject image is formed through the imaging optical system, and converts the formed subject image into image signals. The image signal processing section performs an image processing for correcting the image signals with respect to the distortion. The light-amount characteristic giving section gives the subject image a characteristic in which the amount of light at a center part of the subject image formed at the light-reception surface of the image sensor is larger than that at a peripheral part of the subject image.

10 Claims, 5 Drawing Sheets

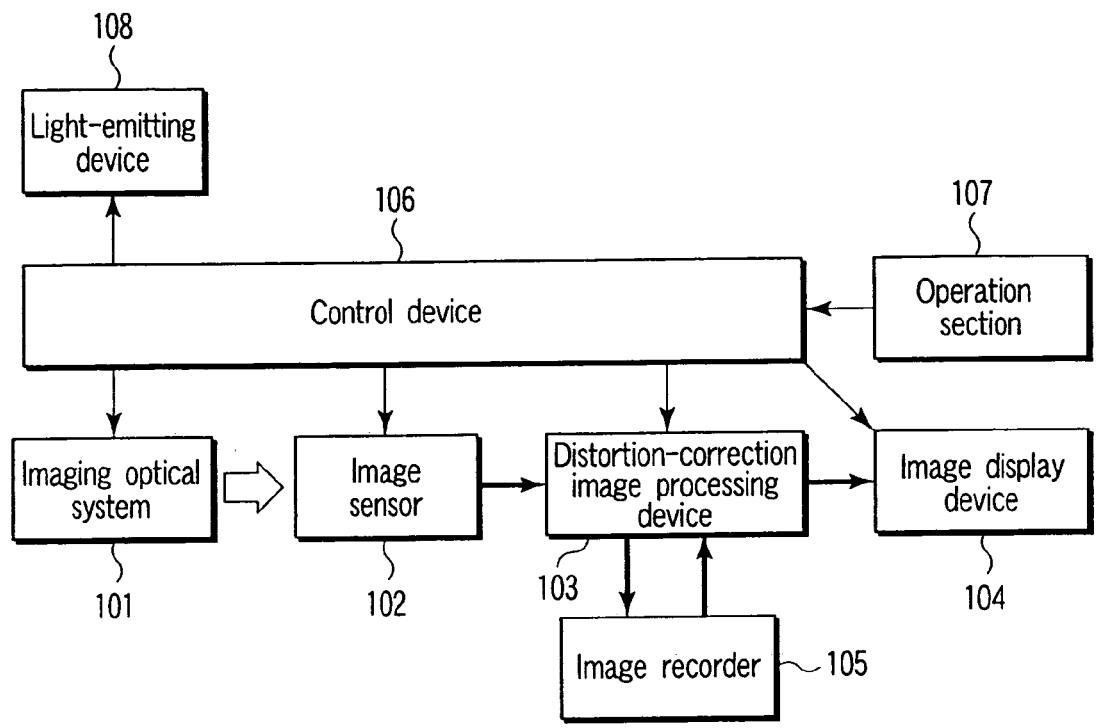
F I G. 1
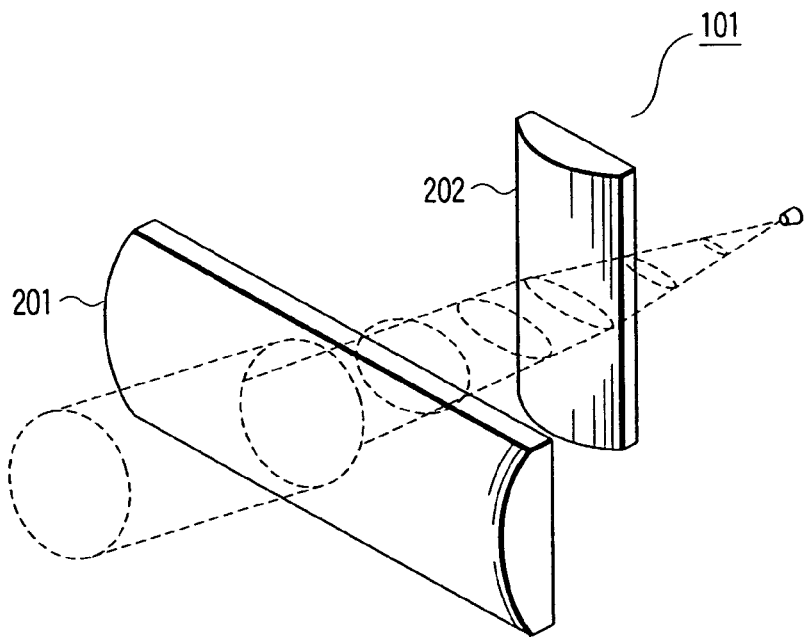
F I G. 2

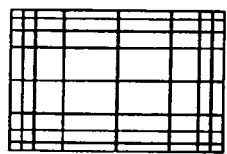
F I G. 3A
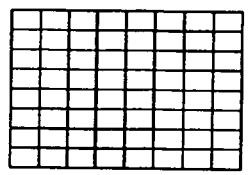
F I G. 3B
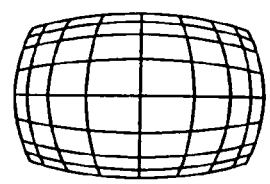
F I G. 3C
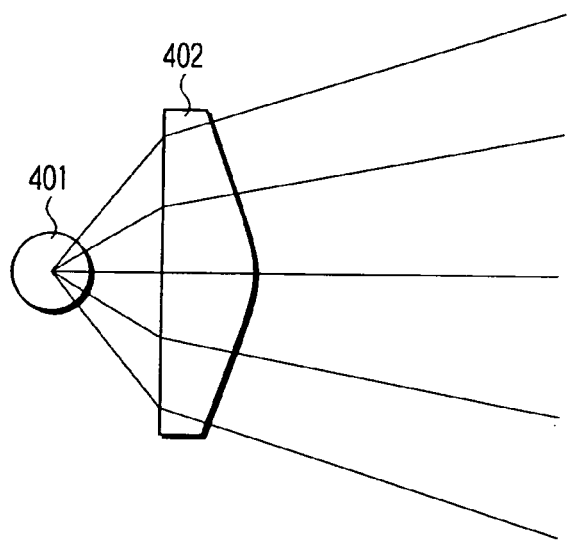
F I G. 4A
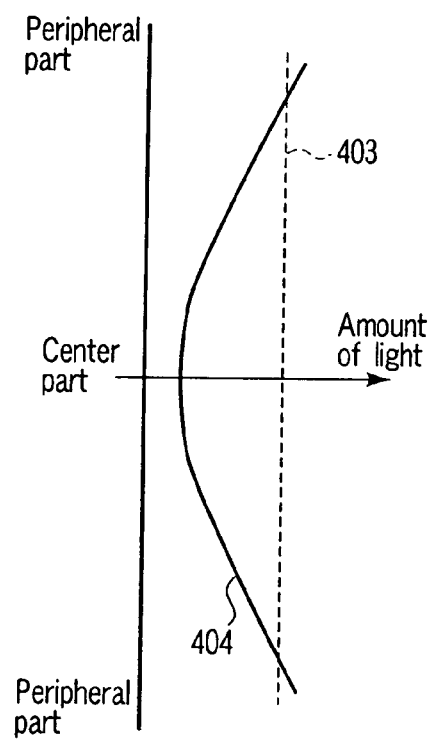
F I G. 4B
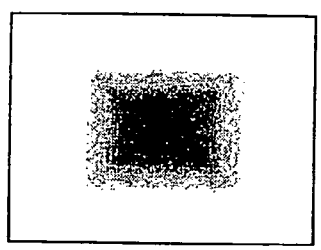
F I G. 5A
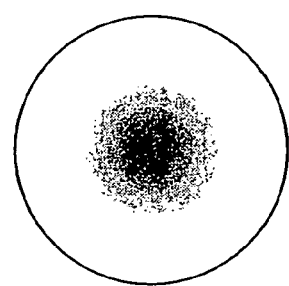
F I G. 5B

IMAGE PICKUP APPARATUS

CROSS-REFERENCE TO RELATED APPLICATIONS

This application is based upon and claims the benefit of priority from prior Japanese Patent Application No. 2005-176553, filed Jun. 16, 2005, the entire contents of which are incorporated herein by reference.

BACKGROUND OF THE INVENTION

1. Field of the Invention

The present invention relates to an image pickup apparatus.

2. Description of the Related Art

Widely used image pickup apparatuses such as a digital still camera or a video camera have a lens whose focal length is changed in accordance with the distance between lens and subject and the angle of view, and which uses a zoom capability of zooming the subject image by using the lens. The zoom capability is roughly classified into optical and electronic zoom capabilities. In the optical zoom capability, the subject image is zoomed by mechanically moving the lens provided in the image pickup apparatus. In the electronic zoom capability, an image output from an image sensor is processed such that appropriate pixels are interpolated into pixels constituting the image, or pixels are thinned out therefrom, thereby enlarging or reducing the subject image. In such a manner, the electronic zoom capability does not need a driving mechanism for the lens. Accordingly, the image pickup apparatus having the electronic zoom capability can be formed compactly at low cost, but provides an image with a low quality, as compared with the image pickup apparatus having the optical zoom capability.

As shown in FIG. 10, Jpn. Pat. Appln. KOKAI Publication No. 10-233950 discloses an image input optical system 901 having a function of squeezing a peripheral part of an input image, and a light-reception device 902 which receives light transmitted through the image input optical system 901 to form a subject image, and has pixels arranged at a uniform density. The subject image is corrected, since it is distorted through the image input optical system 901. By virtue of the above feature, even with the electronic zoom capability, the invention of the publication can form an image whose center part is equivalent in quality to that of an image obtained with the optical zoom capability. However, in the method of the publication, when images are formed by using a wide-angle lens or a telephoto lens, although their center parts are not low in quality, their peripheral parts are low in quality.

BRIEF SUMMARY OF THE INVENTION

According to a first aspect of the present invention, there is provided an image pickup apparatus comprising:

an imaging optical system having a distortion in which a center part of an image is stretched, and a peripheral part of the image is squeezed;

an image sensor including a light reception surface at which an image of a subject is formed as a subject image through the imaging optical system, and configured to convert the subject image formed at the light reception surface into image signals;

an image signal processing section configured to perform an image processing to correct a distortion of an image corresponding to the image signals; and a light-amount characteristic giving section configured to give the subject image a characteristic in which an amount of light at a center part of the subject image formed at the light reception surface of the image sensor is larger than that at a peripheral part of the subject image.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing the configuration of a digital camera system which is an example of an image pickup apparatus according to a first embodiment of the present invention.

FIG. 2 is a view showing an example of the structure of an imaging optical system.

FIG. 3A is a view showing an image formed by a cylindrical optical system.

FIG. 3B is a view showing an image formed by an ordinary imaging optical system having no distortion.

FIG. 3C is a view showing an image formed by a coaxial imaging optical system.

FIG. 4A is a view showing the structure of a conventional light-emitting device.

FIG. 4B is a view showing a light-amount distribution characteristic of the conventional light-emitting device and a subject-image light-amount distribution characteristic thereof subjected to distortion correction.

FIG. 5A is a view showing an example of an image which is obtained by correcting an image distortion caused by a cylindrical optical system.

FIG. 5B is a view showing an example of an image which is obtained by correcting an image distortion caused by a coaxial optical system.

DETAILED DESCRIPTION OF THE INVENTION

Figure 6A:
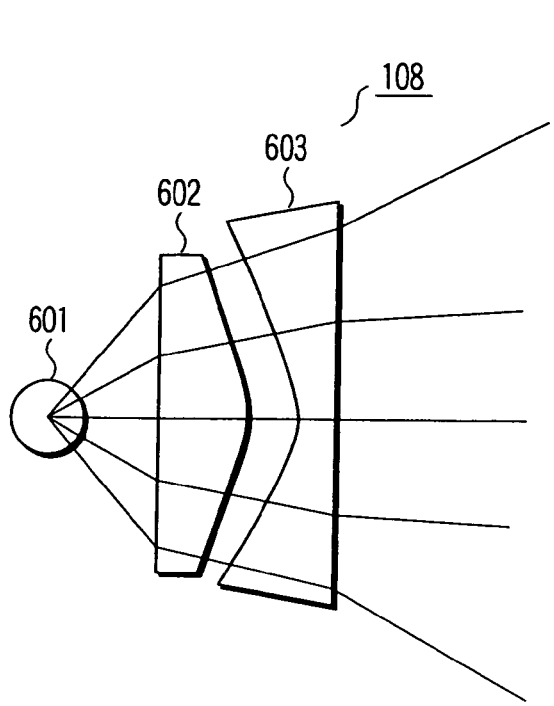
FIG. 6A is a view showing the structure of a light-emitting device applied in the first embodiment.

Embodiments of the present invention will be explained with reference to the accompanying drawings.

FIRST EMBODIMENT

FIG. 1 is a view showing the configuration of a digital camera system which is an example of an image pickup apparatus according to a first embodiment of the present invention. An imaging optical system 101 is an optical system having a distortion in which a central part of a formed image of a subject (subject image) is stretched, and a peripheral part of the image is squeezed. An image sensor 102 is a photoelectric conversion device for converting the subject image formed through the imaging optical system 101 is converted into electrical signals. As the image sensor 102, for example, a CCD sensor or a CMOS sensor is used. On a light reception surface of the image sensor 102, a Bayer filter is pasted. From the image sensor 102, image data containing Bayer pattern color information is output.

A distortion-correction image processing device 103 serving as an image signal processing section performs a conversion processing for converting image data output from the image sensor 102 into image data having a format suited for displaying and recording, a correction processing for correcting the image data influenced by the distortion occurring due to the image pickup system 101, an image processing for obtaining an image of a higher quality, and a compression processing necessary for recording. An image display device 104 comprises a liquid crystal monitor and a drive control circuit, etc. The image display device 104 displays an image based on image data processed by the distortion-correction image processing device 103. An image recorder 105 is formed of, e.g., a semiconductor memory or a magnetic memory. The image recorder 105 records image data compression-processed by the distortion-correction image processing device 103. A control device 106 controls the operation of the digital camera system, which comprises the imaging optical system 101, the image sensor 102, the distortion-correction image processing device 103, and the image display device 104, etc. An operation section 107 comprises buttons, switches and an information display section, etc. The buttons and switches are used by the user to operate the camera system. The information display section is provided to display the operated state of the buttons and switches. A light-emitting device 108 serving as a light-amount characteristic giving section is provided to illuminate the subject. The structure of the light-emitting device 108 will be described later.

FIG. 2 is a view showing an example of the structure of the imaging optical system 101. To be more specific, FIG. 2 shows a combination of cylindrical lenses 201 and 202 as an example of the imaging optical system 101, the cylindrical lenses 201 and 202 being located to extend horizontally and vertically, respectively. FIG. 3A is a view showing an image formed through the imaging optical system 101. FIG. 3B is a view showing an image formed by an ordinary imaging optical system having no distortion. As can be seen from the comparison between the image shown in FIG. 3A and that in FIG. 3B, the image shown in FIG. 3A is distorted such that it is progressively squeezed in a direction toward its outer peripheral sides.

FIG. 3C is a view showing an image formed by a coaxial imaging optical system. As can be seen from the comparison between the image shown in FIG. 3C and that in FIG. 3B, the image shown in FIG. 3C suffers from barrel distortion. To be more specific, the image is distorted such that it is progressively squeezed in a direction away from its center.

It should be noted that an optical system may be used which causes the formed image to suffer from a combination of the distortion exhibited by the image shown in FIG. 3A and that by the image in FIG. 3C. In general, such distortion as shown in FIG. 3A can be corrected to achieve a higher quality than in that shown in FIG. 3C.

Next, the operation of the digital camera system which is configured as shown in FIG. 1 will be explained.

The subject is illuminated by the light-emitting device 108. A subject image obtained at this time is sent to the light reception surface of the image sensor 102 after its center part is stretched, and its peripheral part is squeezed, by the imaging optical system 101. The subject image suffering from such distortion is converted into electrical signals (image signals) by the image sensor 102. The image signals obtained by the image sensor 102 are output from respective pixels arranged at the light reception surface of the image sensor 102. The image signals output in such a manner are converted into digital image signals though an analog front end circuit not shown (which comprises a correlation double sampling circuit for eliminating noise, a gate array which performs gain adjustment, and an analog-to-digital (A/D) conversion circuit for converting an analog image signal into a digital image signal, etc.). Then, the digital image signals are input to the distortion-correction image processing device 103.

The digital image signals input to the distortion-correction image processing device 103 are subjected to various kinds of image processings such as processing for correcting the digital image signals such that an image corresponding to the digital image signals does not suffer from distortion.

After subjecting to those image processings, the digital image signals are processed such that the image corresponding to the digital image signals is compressed. The compressed digital image signals are then recorded by the image recorder 105. As occasion arises, an image is displayed by the image display device 104 based on the digital image signals subjected to the above image processings.

Next, the characteristics of the subject image formed at the image sensor 102 by the imaging optical system 101 will be explained. In the following explanation, suppose the subject has a uniform brightness distribution.

In order to compare the first embodiment with a conventional light-emitting device, the structure of the conventional light-emitting device is shown in FIG. 4A, and light-amount distribution characteristics of the conventional light-emitting device and subject-image light-amount distribution characteristics thereof subjected to distortion correction are shown in FIG. 4B.

The conventional light-emitting device comprises a light-emitting element 401 and a lens 402. Light from the light-emitting element 401 is converged by the lens 402, and then emitted onto the subject. In this case, the light-emitting device shown in FIG. 4A, i.e., the conventional light-emitting device, emits, onto the subject, light whose light-amount distribution is substantially uniform as indicated by a broken line 403 in FIG. 4B.

When the distortion of an image formed by the conventional light-emitting device having the above structure is corrected by the distortion-correction image processing device 103, the resultant subject-image light-amount distribution of the image is obtained as indicated by a line 404. To be more specific, the image input to the distortion-correction image processing device 103 is stretched at its center part, and is squeezed at its peripheral part, due to the characteristics of the imaging optical system 101. Thus, in order to correct such deformation of the image, correction is carried out to squeeze the center part, and stretch the peripheral part. Therefore, when an image of the subject having a uniform brightness distribution is picked up, the amount of light from the center part is smaller than that from the peripheral part as indicated by the line 404.

FIGS. 5A and 5B are views showing images corrected by the distortion-correction processing device 103. More specifically, FIG. 5A shows an example of an image obtained by correcting an image distortion caused by such a cylindrical optical system as shown in FIG. 3A, and FIG. 5B shows an example of an image obtained by correcting an image distortion caused by such a coaxial optical system as shown in FIG. 3C. In both the images shown in FIGS. 5A and 5B, even in the case of picking up an image of a subject having a uniform brightness distribution, when the peripheral part squeezed due to the image distortion caused by the imaging optical system 101 is corrected, the center part is darkened, thus causing shading.

In view of the above, according to the first embodiment, the light-emitting device 108 is structured as shown in FIG. 6A. As shown therein, the light-emitting device 108 comprises a light-emitting element 601 and lenses 602 and 603. The lenses 602 and 603 are configured to enable light from the light-emitting device 601 to be emitted as light having such light-amount distribution characteristics as shown by broken line 640 in FIG. 6B. That is, the lenses 602 and 603 enable a larger amount of light to be emitted on the center part of the subject.

Figure 6B:
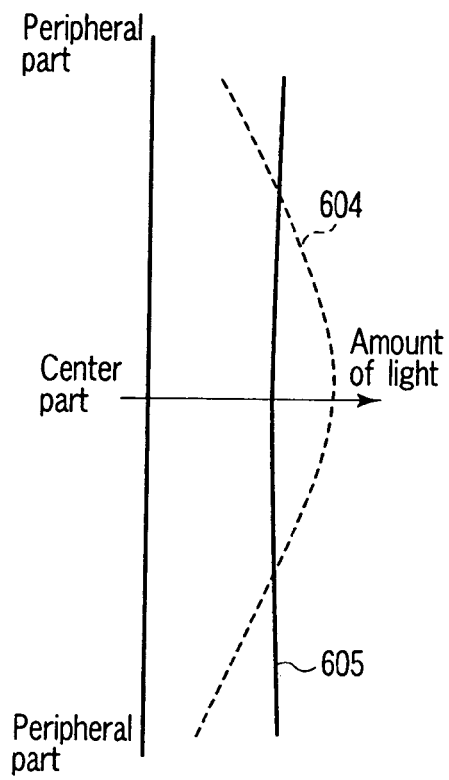
FIG. 6B is a view showing a light-amount distribution characteristic and a subject-image light-amount distribution characteristic obtained after correcting the image distortion.

When such light from the light-emitting device 108 is incident on the subject, the subject image corrected by the distortion-correction image processing device 103 has such subject-image light-amount distribution characteristics as shown by line 605 in FIG. 6B. In this case, the shading at the center part is corrected, and the peripheral part of the input image is squeezed. Thus, a device having a function of correcting the squeeze can also form an image having a high quality.

Figure 7A:
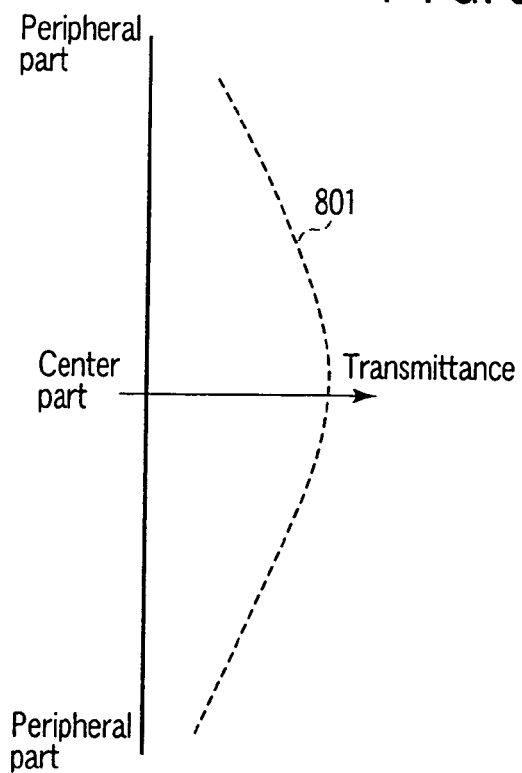
FIG. 7A is a view showing a transmittance characteristic of a filter applied in a modification of the first embodiment.
Figure 7B:
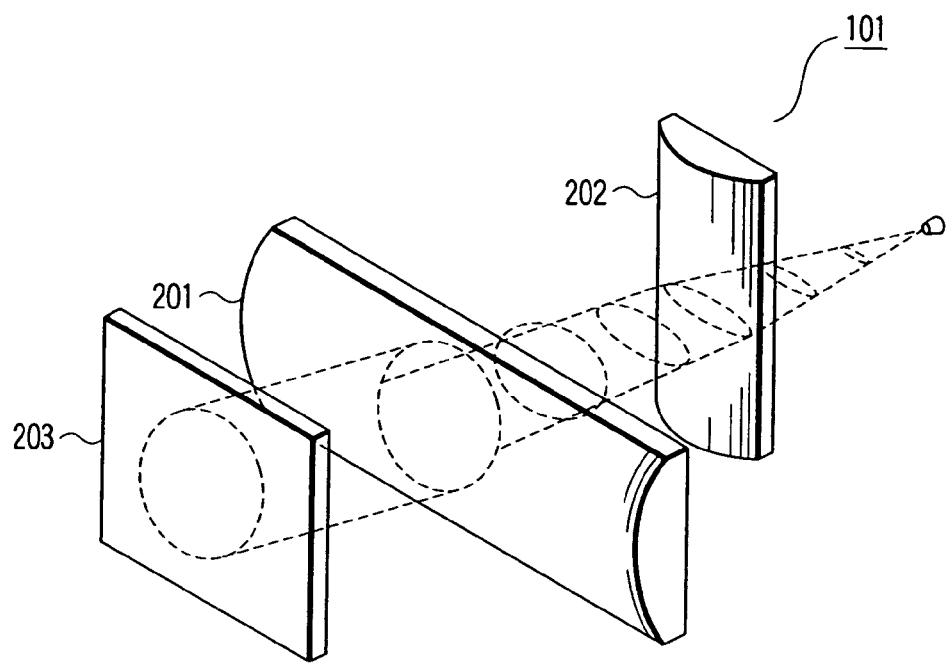
FIG. 7B is a view showing an imaging optical system incorporating the filter shown in FIG. 7A.

It should be noted that the members constituting the structure for correcting the shading occurring in correction of the distortion are not limited to the lenses 602 and 603 explained with reference to FIGS. 6A and 6B. That is, in order to correct the shading, it suffices that the amount of light at the central part of the subject is increased as shown in FIG. 6B. Thus, for example, as shown in FIG. 7B, the imaging optical system 101 may incorporate an optical filter 203 having a transmittance in which when light is reflected from the subject, the amount of light which can be transmitted from the center part of the subject through the optical filter 203 is larger than that from the peripheral part of the subject, as indicated by. e.g., broken line 801 in FIG. 7A. Due to use of such an optical filter, the lenses of the light-emitting device can be simplified in design and structure.

SECOND EMBODIMENT

Figure 8:
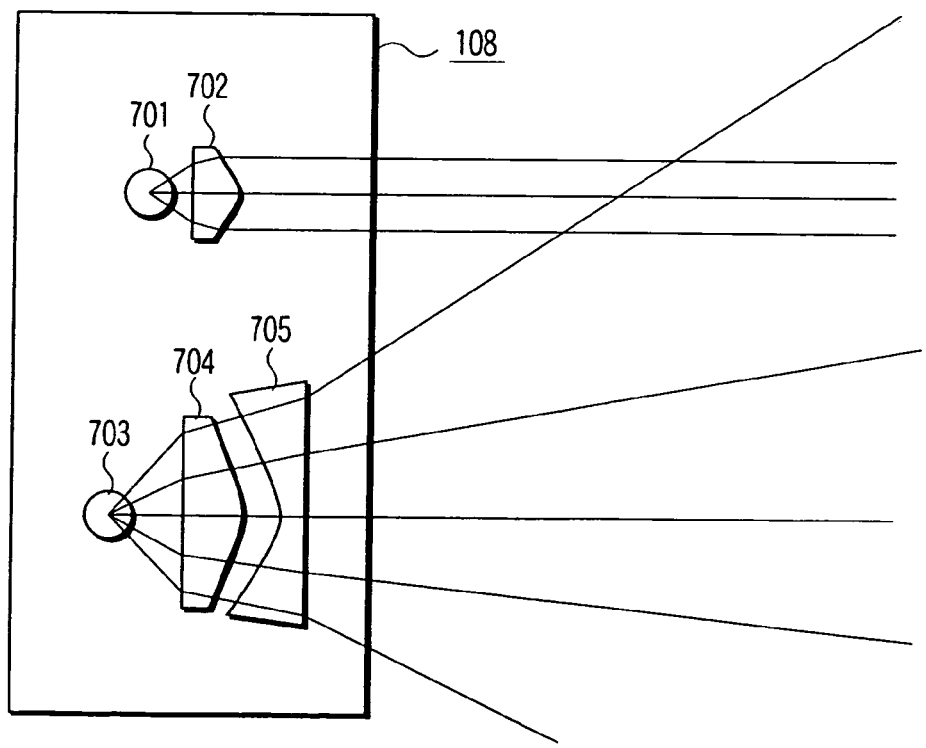
FIG. 8 is a view for use in explaining a light-emitting device applied in the second embodiment.

A second embodiment of the present invention will be explained. FIG. 8 is a view showing the structure of a light-emitting device according to the second embodiment. The explanation of the structure of the image pickup apparatus according to the second embodiment will be omitted, since the structure is the same as that shown in FIG. 1, with the exception of the following:

The light-emitting device according to the second embodiment, as shown in FIG. 8, comprises a first light-emitting section for illuminating only the center part of the subject, and a second light-emitting section for illuminating both the center part and peripheral part of the subject.

In the first light-emitting section, a light-emitting element 701 and a lens 702 are arranged in the same manner as in the light-emitting section shown in FIG. 4A. On the other hand, in the second light-emitting device, a light-emitting element 703 and lenses 704 and 705 are arranged in the same manner as in the light-emitting device shown in FIG. 6A.

As described with respect to the first embodiment, the peripheral part of the subject image is squeezed due to the distortion with the imaging optical system 101, as a result of which when the peripheral part squeezed due to the distortion with the imaging optical system 101 is corrected, the center part is darkened, thus causing shading.

In contrast, the light-emitting device according to the second embodiment, as mentioned above, includes the first light-emitting section for illuminating the center part of the subject, in addition to the second light-emitting section for evenly illuminating the entire subject, thereby more reliably correcting the shading occurring in correction of the part squeezed due to the distortion.

Moreover, since the two light-emitting sections are separated from each other, they can be simplified in design and structure.

Figure 9:
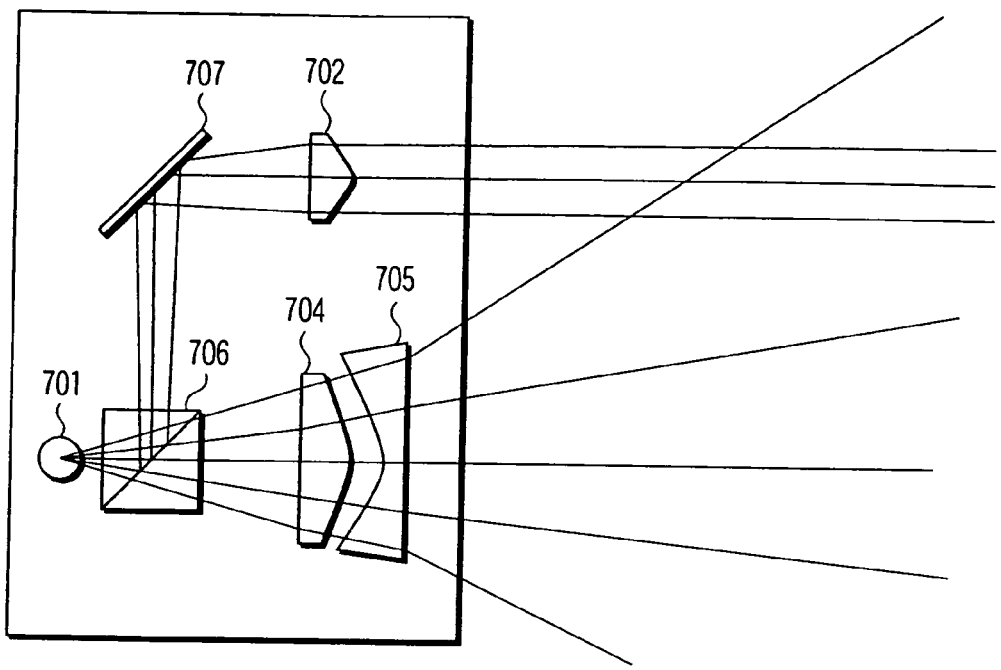
FIG. 9 is a view showing a modification of the second embodiment.
Figure 10:
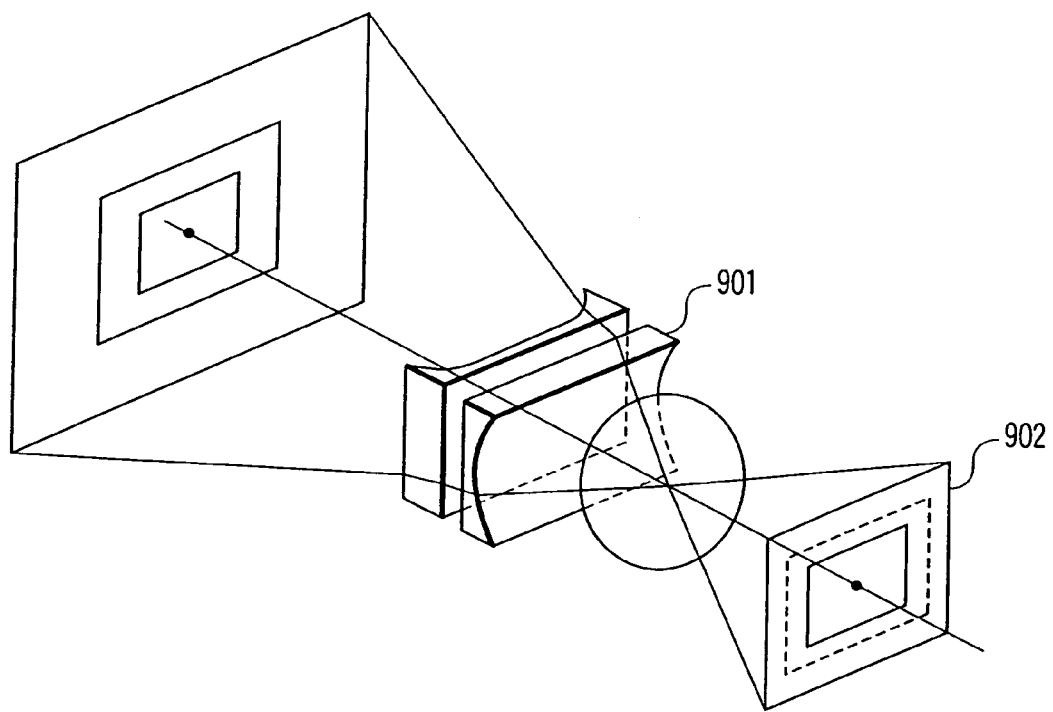
FIG. 10 is a view showing a conventional light-emitting device.

It should be noted that in the light-emitting device shown in FIG. 8, the two light-emitting section includes respective light-emitting elements. However, as shown in FIG. 9, it may include only one light-emitting device. To be more specific, it may be formed such that light emitted from a single light-emitting device, i.e., the light-emitting element 701, is separated into spectral components by a half mirror 706 and a mirror 707.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus comprising:
    an imaging optical system having a distortion in which a center part of an image is stretched, and a peripheral part of the image is squeezed;
    an image sensor including a light reception surface at which an image of a subject is formed as a subject image through the imaging optical system, and configured to convert the subject image formed at the light reception surface into image signals;
    an image signal processing section configured to perform an image processing to correct a distortion of an image corresponding to the image signals; and
    a light-amount characteristic giving section configured to give the subject image a characteristic in which an amount of light at a center part of the subject image formed at the light reception surface of the image sensor is larger than that at a peripheral part of the subject image.

2. The image pickup apparatus according to claim 1, wherein the light-amount characteristic giving section includes a light-emitting section configured to illuminate the subject by applying light to the subject such that an amount of light applied to a center part of the subject is larger than that of light applied to a peripheral part of the subject.

3. The image pickup apparatus according to claim 2, wherein the light-emitting section comprises:
    a first light-emitting section configured to illuminate only the center part of the subject; and
    a second light-emitting section configured to illuminate both the center part and peripheral part of the subject.

4. The image pickup apparatus according to claim 1, wherein the light-amount characteristic giving section includes an optical filter which passes light reflected from the subject, and an amount of light which is transmitted from the center part of the subject through the optical filter is larger than that from the peripheral part of the subject through the optical filter.

5. The image pickup apparatus according to claim 2, wherein the light-amount characteristic giving section includes an optical filter which passes light reflected from the subject, and an amount of light which is transmitted from the center part of the subject through the optical filter is larger than that from the peripheral part of the subject through the optical filter.

6. An image pickup apparatus comprising:
  imaging optical means having a distortion in which a center part of an image is stretched, and a peripheral part of the image is squeezed;
  image pickup means including a light reception surface at which an image of a subject is formed as a subject image through the imaging optical means, and for converting the subject image formed at the light reception surface into image signals;
  image signal processing means for performing an image processing to correct a distortion of an image corresponding to the image signals; and
  light-amount characteristic giving means for giving the subject image a characteristic in which an amount of light at a center part of the subject image formed at the light reception surface of the image sensor is larger than that at a peripheral part of the subject image.

7. The image pickup apparatus according to claim 6, wherein the light-amount characteristic giving means includes light-emitting means for illuminating the subject by applying light to the subject such that an amount of light applied to a center part of the subject is larger than that of light applied to a peripheral part of the subject.

8. The image pickup apparatus according to claim 7, wherein the light-emitting means comprises:
  first light-emitting means for illuminating only the center part of the subject; and
  second light-emitting means for illuminating both the center part and peripheral part of the subject.

9. The image pickup apparatus according to claim 6, wherein the light-amount characteristic giving means includes optical filter means for passing light reflected from the subject, and an amount of light which is transmitted from the center part of the subject through the optical filter means is larger than that from the peripheral part of the subject through the optical filter means.

10. The image pickup apparatus according to claim 7, wherein the light-amount characteristic giving means includes optical filter means for passing light reflected from the subject, and an amount of light which is transmitted from the center part of the subject through the optical filter means is larger than that from the peripheral part of the subject through the optical filter means.

* * * * *